US009607339B1

(12) United States Patent
Mullen et al.

(10) Patent No.: US 9,607,339 B1
(45) Date of Patent: Mar. 28, 2017

(54) SYSTEM AND METHOD FOR FACILITATING TRANSPORTATION OF A VEHICLE INVOLVED IN A CRASH

(71) Applicant: STATE FARM MUTUAL AUTOMOBILE INSURANCE COMPANY, Bloomington, IL (US)

(72) Inventors: Christina P. Mullen, Waterford, VA (US); William J. Leise, Normal, IL (US); Douglas Albert Graff, Mountain View, MO (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/010,895

(22) Filed: Jan. 29, 2016

Related U.S. Application Data

(63) Continuation of application No. 14/635,043, filed on Mar. 2, 2015, which is a continuation of application No. 14/335,501, filed on Jul. 18, 2014, now Pat. No. 8,977,425, which is a continuation of application No. 14/085,487, filed on Nov. 20, 2013, now Pat. No. 8,972,100.

(60) Provisional application No. 61/798,949, filed on Mar. 15, 2013.

(51) Int. Cl.
| *G06Q 40/08* | (2012.01) |
| *G06Q 30/02* | (2012.01) |
| *G07C 5/00* | (2006.01) |
| *G07C 5/08* | (2006.01) |

(52) U.S. Cl.
CPC ......... *G06Q 40/08* (2013.01); *G06Q 30/0283* (2013.01); *G07C 5/008* (2013.01); *G07C 5/0841* (2013.01)

(58) Field of Classification Search
CPC .......... G06F 13/00; G06F 13/14; G06F 17/00
USPC ........................................................ 701/31.4
See application file for complete search history.

(56) References Cited

U.S. PATENT DOCUMENTS

| 5,128,859 | A | 7/1992 | Carbone et al. |
| 5,317,503 | A | 5/1994 | Inoue |
| 5,432,904 | A | 7/1995 | Wong |
| 5,839,112 | A | 11/1998 | Schreitmueller et al. |
| 5,950,169 | A | 9/1999 | Borghesi et al. |
| 6,885,981 | B2 | 4/2005 | Bomar, Jr. et al. |
| 7,324,951 | B2 | 1/2008 | Renwick et al. |
| 7,502,772 | B2 | 3/2009 | Kidd et al. |
| 7,596,512 | B1 | 9/2009 | Raines et al. |
| 7,636,676 | B1 | 12/2009 | Wolery et al. |
| 8,200,513 | B2 | 6/2012 | Vahidi et al. |

(Continued)

FOREIGN PATENT DOCUMENTS

WO    WO-2005/043343 A2    5/2005

OTHER PUBLICATIONS

Allstate, "Auto Insurance Ballpark Estimate & Online Insurance Quote," (2014). Retrieved from the Internet: <URL:http://www.allstate.com/auto-insurance/quick-auto-insurance-quote.aspx>.

(Continued)

*Primary Examiner* — Anne M Antonucci
(74) *Attorney, Agent, or Firm* — Marshall, Gerstein & Borun LLP; Randall G. Rueth

(57) ABSTRACT

A system, method, and computer-readable medium to facilitate treatment of a damaged vehicle by gathering crash information, estimating an extent of vehicle damage, and requesting transport of the damaged vehicle from the crash site to a treatment facility.

19 Claims, 9 Drawing Sheets

(56) References Cited

U.S. PATENT DOCUMENTS

| | | |
|---|---|---|
| 8,265,963 B1 | 9/2012 | Hanson et al. |
| 8,311,856 B1 | 11/2012 | Hanson et al. |
| 8,755,779 B1 | 6/2014 | Burks et al. |
| 8,788,301 B1 | 7/2014 | Marlow et al. |
| 8,799,034 B1 | 8/2014 | Brandmaier et al. |
| 8,891,435 B2 | 11/2014 | Zhang et al. |
| 8,972,100 B2 | 3/2015 | Mullen et al. |
| 8,977,425 B1 | 3/2015 | Mullen et al. |
| 2002/0055861 A1 | 5/2002 | King et al. |
| 2003/0009270 A1 | 1/2003 | Breed |
| 2004/0083041 A1 | 4/2004 | Skeen et al. |
| 2004/0148188 A1 | 7/2004 | Uegaki |
| 2004/0153356 A1 | 8/2004 | Lockwood et al. |
| 2005/0108065 A1 | 5/2005 | Dorfstatter |
| 2006/0195384 A1 | 8/2006 | Bauer et al. |
| 2008/0046261 A1 | 2/2008 | Cunningham |
| 2008/0183600 A1 | 7/2008 | Bowser et al. |
| 2008/0243556 A1 | 10/2008 | Hogan et al. |
| 2008/0306996 A1 | 12/2008 | McClellan et al. |
| 2009/0018859 A1 | 1/2009 | Purifoy et al. |
| 2009/0043601 A1 | 2/2009 | Schuh et al. |
| 2009/0062978 A1 | 3/2009 | Picard |
| 2009/0300065 A1 | 12/2009 | Birchall |
| 2010/0138242 A1 | 6/2010 | Ferrick et al. |
| 2010/0198637 A1 | 8/2010 | Jenkins et al. |
| 2011/0010276 A1 | 1/2011 | Bowser et al. |
| 2011/0058048 A1 | 3/2011 | Elazar et al. |
| 2011/0087505 A1 | 4/2011 | Terlep |
| 2011/0313936 A1 | 12/2011 | Sieger |
| 2011/0313951 A1 | 12/2011 | Cook |
| 2012/0136802 A1 | 5/2012 | McQuade et al. |
| 2012/0265563 A1 | 10/2012 | Kwasny |
| 2013/0218761 A1 | 8/2013 | Kwasny |
| 2014/0081876 A1 | 3/2014 | Schulz |
| 2014/0278571 A1 | 9/2014 | Mullen et al. |
| 2014/0278572 A1 | 9/2014 | Mullen et al. |
| 2014/0279169 A1 | 9/2014 | Leos |
| 2015/0178852 A1 | 6/2015 | Mullen et al. |

OTHER PUBLICATIONS

Final Office Action for U.S. Appl. No. 14/085,497 dated Dec. 24, 2014.
Final Office Action for U.S. Appl. No. 14/085,497 dated Jul. 16, 2015.
Final Office Action for U.S. Appl. No. 14/085,512 dated Jul. 16, 2015.
Final Office Action for U.S. Appl. No. 14/085,512 dated Nov. 28, 2014.
Final Office Action for U.S. Appl. No. 14/635,043 dated Sep. 1, 2015.
Glennon, Automobile crash event data recorder downloading, CrashForensics.com, archived Aug. 10, 2009, available at: http://www.crashforensics.com/automobiledatarecorders.cfm (accessed Dec. 12, 2015).
Glennon, Crash investigation and reconstruction references, CrashForensics.com, archived Oct. 27, 2010, available at http://www.crashforensics.com/papers.cfm?PaperID=20 (accessed Dec. 12, 2015).
Google.com, search results for the string "Auto Repair Quote" (2014).
LKQonline.com webpage, available at <http://www.lkqonline.com/custom/content/recycledautoparts.htm> (visited on Feb. 19, 2014; archived on Sep. 1, 2009.
Non-final Office Action for U.S. Appl. No. 14/085,497 dated Apr. 8, 2015.
Non-final Office Action for U.S. Appl. No. 14/085,497 dated Dec. 22, 2015.
Non-final Office Action for U.S. Appl. No. 14/085,497 dated Feb. 27, 2014.
Non-final Office Action for U.S. Appl. No. 14/085,497 dated Sep. 10, 2014.
Non-final Office Action for U.S. Appl. No. 14/085,512 dated Feb. 28, 2014.
Non-final Office Action for U.S. Appl. No. 14/085,512 dated Jul. 18, 2014.
Non-final Office Action for U.S. Appl. No. 14/085,512 dated Mar. 25, 2015.
Non-final Office Action for U.S. Appl. No. 14/635,043 dated Apr. 7, 2015.
Non-final Office Action for U.S. Appl. No. 14/085,487 dated Feb. 12, 2014.
Non-final Office Action for U.S. Appl. No. 14/085,512, mailed Dec. 21, 2015.
Notice of Allowance, U.S. Appl. No. 14/085,487 dated Jun. 17, 2014.
Notice of Allowance, U.S. Appl. No. 14/335,501, mailed Jan. 2, 2015.
Notice of Allowance, U.S. Appl. No. 14/335,501, mailed Jan. 28, 2015.
Notice of Allowance, U.S. Appl. No. 14/335,501, mailed Nov. 21, 2014.
Notice of Allowance, U.S. Appl. No. 14/335,501, mailed Sep. 11, 2014.
Notice of Allowance, U.S. Appl. No. 14/635,043, mailed Nov. 25, 2015.
State Farm, "Insurance Rate Quote," (2014). Retrieved from the Internet: <URL:https://www.statefarm.com/insurance/quotes>.

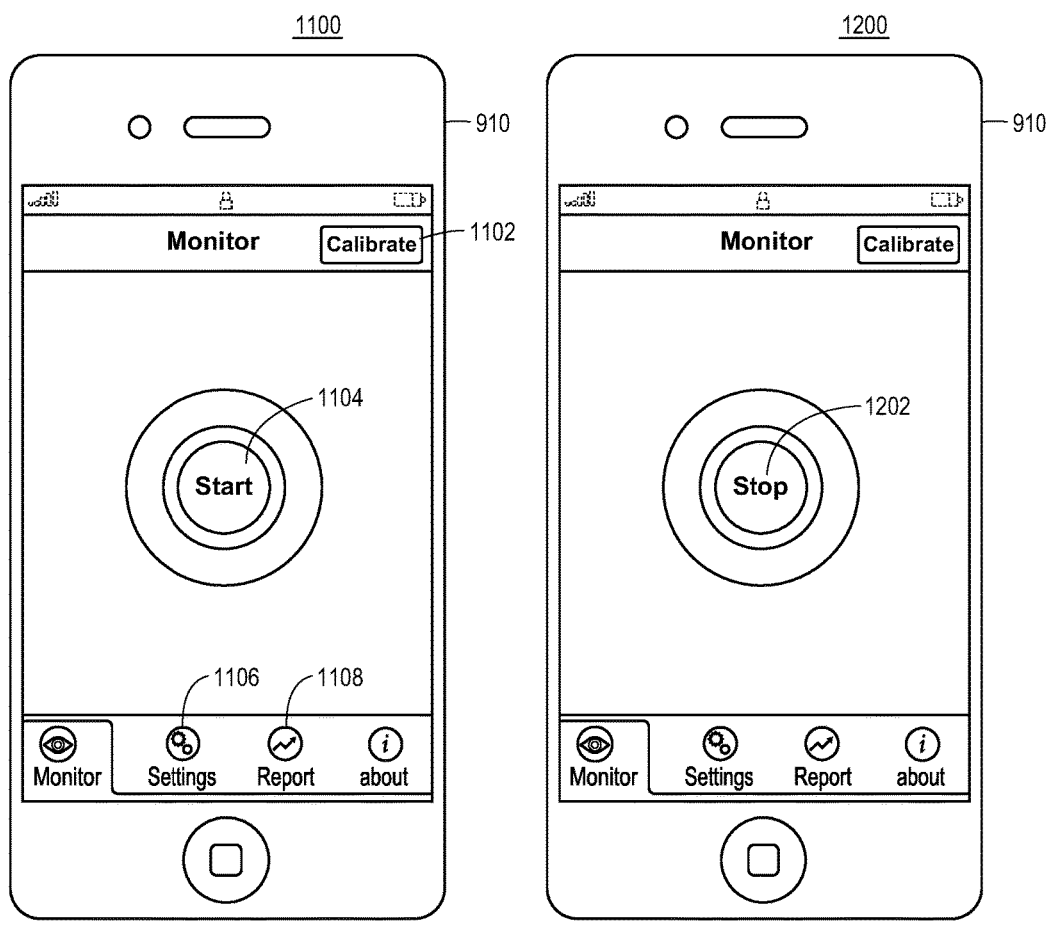
*FIG. 11*  *FIG. 12*

SYSTEM AND METHOD FOR FACILITATING TRANSPORTATION OF A VEHICLE INVOLVED IN A CRASH

RELATED APPLICATIONS

This application is a continuation application of U.S. patent application Ser. No. 14/635,043 filed Mar. 2, 2015, which is a continuation application of U.S. patent application Ser. No. 14/335,501 filed Jul. 18, 2014 (now U.S. Pat. No. 8,977,425); which is a continuation application of U.S. patent application Ser. No. 14/085,487 filed Nov. 20, 2013 (now U.S. Pat. No. 8,972,100); which claims benefit to the filing date of U.S. Provisional Patent Application 61/798,949, filed Mar. 15, 2013; and the contents of each of these applications are expressly incorporated herein by reference. This application is also related to pending U.S. patent application Ser. No. 14/085,497, "System And Method For Treating A Damaged Vehicle," filed Nov. 20, 2013; and Ser. No. 14/085,512, "System And Method For Routing A Vehicle Damaged In A Crash," filed Nov. 20, 2013; and the contents of each of these patent applications are expressly incorporated herein by reference.

TECHNICAL FIELD

The present disclosure generally relates to a system and a method for treating a vehicle damaged in a crash and, more particularly, to estimating the amount of damage to the vehicle and facilitating transportation of the damaged vehicle to an appropriate treatment facility.

BACKGROUND

Every year, vehicles are involved in collisions that result in varying amounts of damage to the vehicle. If the damaged vehicle is insured, an insurance claim is usually filed shortly after the collision. The damaged vehicle is typically brought to a location where an appraisal or assessment of the damage is made. Depending on the extent of the damage and the treatment facility where the damaged vehicle was brought, the damaged vehicle may then need to be further transported to a different treatment facility that is capable of performing the necessary repairs, or in the case where the damage is too costly to repair, to a salvage or a scrap facility. Additional costs are incurred when the damaged vehicle is brought to a first location for the initial appraisal and then to a subsequent location for the repair or salvage. By determining the extent of damage to the vehicle and the corresponding treatment shortly after a collision, the time and costs involved to currently process an insurance claim may be reduced.

SUMMARY

Example systems and methods for treating and/or routing a damaged vehicle after a crash are herein described. In accordance with a first example aspect of the invention, a method implemented on a computer system for treating a vehicle damaged in a crash includes receiving crash information about the damaged vehicle, determining a crash velocity of the damaged vehicle based on the received crash information, determining a crash direction of the damaged vehicle based on the received crash information, determining a treatment complexity level based on the crash information, and automatically transmitting information associated with the treatment complexity level.

In accordance with a second example aspect of the invention, a computer system for facilitating transportation of a vehicle damaged in a crash includes a first computing device including one or more processors and one or more sensors are coupled to the one or more processors. The one or more sensors monitor operating information of the vehicle and facilitate providing crash information of the damaged vehicle to the first computing device. The computer system includes a first communication module coupled to the one or more processors of the first computing device and wirelessly transmitting the crash information to a second computing device. The second computing device includes one or more processors and one or more memory devices for storing executable instruction that when executed on the one or more processors of the second computing device cause the computer system to evaluate the crash information and determine a treatment complexity level associated with the damaged vehicle. The computer system includes a second communication module coupled to the second computing device, wherein the second communication module transmits information associated with the treatment complexity level.

In accordance with a third example aspect of the invention directed to a computer system for treating a vehicle damaged in a crash, the computer system includes a computing device includes one or more processors coupled to one or more devices, wherein the one or more memory devices store executable instructions that when executed by the one or more processors cause the computer system to determine a treatment complexity level. The computer system includes one or more sensors coupled to the one or more processors for monitoring operating information of the vehicle, wherein the one or more sensors are capable of gathering crash information of the vehicle. The computer system includes a comparator or analyzer operatively coupled to the processor for evaluating the crash information of the vehicle with a compilation of collision data of a vehicle type that includes the damaged vehicle, and a wireless communication module coupled to the processor for transmitting information associated with the treatment complexity level.

In accordance with a fourth example aspect of the invention, a tangible, computer-readable medium stores instructions that when executed by a processor of a computer system cause the computer system to gather crash information about the vehicle, determine a crash velocity of the vehicle based on the crash information, determine a crash direction of the vehicle based on the crash information, determine a treatment complexity level based on an analysis of the crash information with a compilation of collision data of a vehicle type that includes the vehicle, and transmit information associated with the treatment complexity level.

In further accordance with any one or more of the foregoing first, second, third, and fourth example aspects, a method, system, and computer-readable medium may further include any one or more of the following preferred forms.

In one form, determining a treatment complexity level includes comparing the crash velocity of the damaged vehicle to collision data of a vehicle type that includes the damaged vehicle.

In another form, determining a treatment complexity level includes comparing the crash direction of the damaged vehicle to collision data of a vehicle type that includes the damaged vehicle.

In another form, determining a crash velocity of the damaged vehicle includes measuring an acceleration associated with the damaged vehicle and determining the crash velocity from the measured acceleration.

In another form, determining a crash direction of the damaged vehicle includes measuring an acceleration associated with the damaged vehicle and determining the crash direction from the measured acceleration.

In another form, determining a treatment complexity level includes performing a mathematical operation on the crash velocity.

In another form, determining a treatment complexity level includes performing a mathematical operation on the crash direction.

In another form, the method includes monitoring operating information about the damaged vehicle.

In another form, monitoring operating information of a damaged vehicle includes monitoring an operating velocity of the damaged vehicle, and monitoring an operating direction of the damaged vehicle.

In another form, monitoring an operating velocity of the vehicle includes measuring an acceleration associated with the damaged vehicle and determining the velocity of the damaged vehicle from the measured acceleration.

In another form, gathering crash information includes measuring acceleration associated with the damaged vehicle in one or more directions with an accelerometer; and wherein determining a treatment complexity level includes utilizing the measured acceleration to assess acceleration segments including one or more of a fore-aft acceleration and a lateral acceleration.

In another form, the crash information includes a crash velocity of the damaged vehicle and a crash direction of the damaged vehicle.

In another form, the one or more sensors include an accelerometer monitoring acceleration associated with the damaged vehicle in one or more directions.

In another form, the crash information includes a crash velocity of the damaged vehicle determined from the acceleration measured by the accelerometer, and a crash direction of the damaged vehicle determined from the acceleration measured by the accelerometer.

In another form, a comparator operatively coupled to the second computing device compares the crash information of the damaged vehicle to a compilation of collision data of a vehicle type that includes the damaged vehicle.

In another form, the vehicle type includes one or more of a vehicle make, a vehicle model, and a vehicle year.

In another form, the compilation of collision data is stored on the memory.

In another form, the compilation of collision data includes a particular treatment complexity level equated to a particular collision information.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 11-14 depict example embodiments of displayed information on the user interface of the computing device(s) in accordance with the presently described embodiments.

DETAILED DESCRIPTION

A vehicle treatment system utilizes crash information of a vehicle involved in a crash to approximate the extent of damage to the vehicle and determine a treatment facility for treating the damaged vehicle. The estimated vehicle damage is used to calculate a treatment complexity level for treating the vehicle. Based on a determined treatment complexity level, the system identifies a treatment facility capable of treating the damaged vehicle and sends information for transporting the damaged vehicle to the treatment facility, thereby removing the need to initially bring the damaged vehicle to an interim location for a damage assessment before transporting the damaged vehicle to a designated treatment facility for treatment.

More specifically, the vehicle treatment system receives crash information in the form of acceleration, velocity, and/or impact direction of the vehicle at the time of the crash. To estimate the extent of vehicle damage caused in the crash, the system analyzes one or more aspects of the crash information. In one example embodiment, the system calculates an estimate of the vehicle damage by comparing the crash information to collision data of a vehicle type that includes the damaged vehicle. The collision data may include various levels of vehicle damage associated with specified aspects of collision information. For example, one category of vehicle damage in the collision data may be equated to a particular vehicle acceleration or velocity, or a range of vehicle accelerations or velocities. Other categories of vehicle damage in the collision data may also be equated to a vehicle direction, which indicates where the damaged vehicle was likely impacted. Based on the extent of vehicle damage estimated by the comparison of the crash information to the collision data, the system determines a treatment complexity level for treating the damaged vehicle. Thereafter, information related to treating the damaged vehicle is then transmitted by the system. The treatment information may be automatically sent to a treatment facility, a vehicle transporter, a person or entity such as the vehicle owner, or an associated insurance agent, for example. As such, this system allows for vehicles damaged in a collision to be transported directly to a treatment facility capable of performing the desired treatment, e.g., repair, salvage, scrap; soon after the crash, thereby avoiding the time associated with bringing the damaged vehicle to an assessment center or having an adjuster visit the damaged vehicle to assess an insurance claim before the damaged vehicle is brought to a designated treatment facility.

Figure 1:
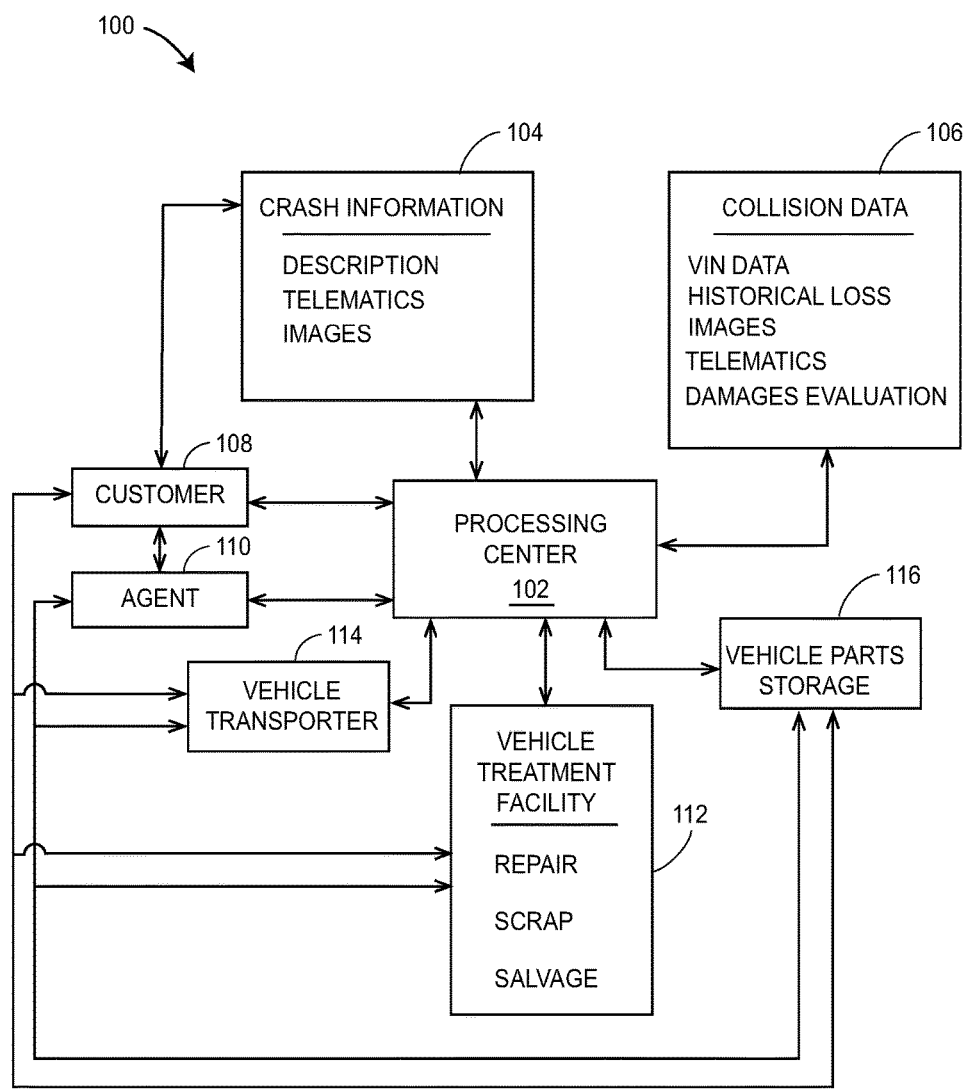
FIG. 1 is a general overview of a vehicle treatment system for treating a vehicle damaged in a crash.

FIG. 1 is a general overview of a system 100 for determining a treatment of a vehicle damaged in a crash. As used herein, the term "vehicle" refers to any type of powered transportation device, which includes, and is not limited to, an automobile, truck, bus, motorcycle, or boat. While the vehicle may normally be controlled by an operator, it is to be understood that the vehicle may be unmanned and remotely or autonomously operated in another fashion, such as using controls other than the steering wheel, gear shift, brake pedal, and accelerator pedal. The system 100 in FIG. 1 includes a processing center 102 capable of facilitating an analysis of the damaged vehicle's crash information 104. The analysis may include a comparison of the damaged vehicle's crash information 104 with collision data 106 to estimate the extent of vehicle damage and determine a treatment for the vehicle. Throughout this description, the term crash is used in reference to the particular incident in which the vehicle was damaged and the term collision is used in reference to one or more incidents in which another vehicle or vehicles were damaged. The analysis of the crash information 104 may be performed by system personnel and/or a computing device at the processing center 102.

The crash information 104 provided to the processing center 102 includes specific information related to the crash that damaged the vehicle and may include information received from the vehicle owner 108, driver, or occupant, an insurance agent 110 and/or entity of the damaged vehicle, an emergency responder, an accident investigator. The crash information 104 may include impact characteristics of the vehicle involved in the crash, which may be provided to system personnel and/or the processing center 102 by an observer of the damaged vehicle. For example, the driver of the damaged vehicle may provide crash information such as the approximate speed of the vehicle at the time of the crash and what area of the vehicle was damaged. Other observed crash information provided to system personnel and/or the processing center 102 may include whether the vehicle's airbags deployed or if the vehicle is drivable. In addition, images of the damaged vehicle may be for comparison to images of vehicles of the same or similar type with known damage from other collisions. Some impact characteristics of the crash may be automatically relayed to system personnel and/or the processing center 102 by telematic devices, e.g., sensors, operatively coupled to the vehicle. The sensors enable a computing device to automatically attain impact characteristics such as vehicle acceleration, velocity, and/or direction at the time of the crash. Additional crash information may include the damaged vehicle's identification number (VIN) and related data, which may have been made available to system personnel and/or the processing center 102 prior to the crash. The VIN data may include the make, model, year, and type of vehicle as well as previous damage/repair information and insurance claim information associated with the damaged vehicle.

Collision data 106 generally includes records or compilations of information involving other vehicles damaged in other collisions, such as VIN data, historical loss information, images, telematic information, and vehicle damage evaluation. The collision data 106 may be periodically updated and any of the collision data utilized by system personnel and/or the processing center 102 may be stored in the system 100 and/or operatively coupled to the processing center.

The VIN data may include vehicle manufacturer information such as recommended repair procedures and costs, vehicle part warranties, costs and market value estimations of various vehicles and vehicle parts, etc. The VIN database may also include vehicle safety information including, and not limited to, vehicle part recall information, safety notices, repair notices, etc. Historical loss information may include observed or measured amounts of vehicle damage associated with or resulting from known, observed, or measured aspects relating to a collision or impact of another vehicle, such as vehicle acceleration, velocity, and/or direction. Some examples of historical loss data include vehicle crash test results, bumper test results, traffic accident investigations, and the like. Various impact characteristics such as vehicle acceleration, velocity, direction, and/or image can be compiled into a chart or table and associated with known vehicle damage. A damage evaluation tool may include a guide or template to be used in estimating the extent of vehicle damage. For example, stored images and operating characteristics of vehicles damaged in other collisions may be used to compare with like images and operating characteristics of the vehicle damaged in the crash.

Treatment for the damaged vehicle can be facilitated by comparing the crash information with the collision data. That is, the extent of vehicle damage resulting from the crash can be estimated by comparing impact aspects of the crash with similar impact aspects of similar vehicles involved in past collisions. The compilation of impact characteristics associated with known vehicle damage from similar vehicles involved in previous collisions can be used as a guide or template to estimate the amount of damage that occurred to the vehicle involved in the crash.

Once the extent of vehicle damage has been estimated, an estimate for treating the vehicle can be determined. In short, various levels of vehicle damage may be equated with various levels of vehicle treatment. That is, the estimated extent of vehicle damage can be equated to a treatment complexity level. For example, minor, medium, and major vehicle damage can be equated to minor, medium and major vehicle repair. Irreparable vehicle damage may be equated to a scrapping or salvaging treatment. Once the vehicle treatment complexity has been estimated, system personnel and/or the processing center 102 may identify a vehicle treatment facility 112 capable of performing the requisite treatment. A vehicle transporter 114 may be contacted by system personnel and/or the processing center 102 to transport the damaged vehicle from the crash site to the identified treatment facility 112, e.g., a service repair center, a scrapping or salvaging facility. For irreparable vehicles, the damaged vehicle may be dismantled before scrapping and undamaged vehicle parts may be salvaged and stored at a warehouse 116 for reuse and resale.

Figure 2:
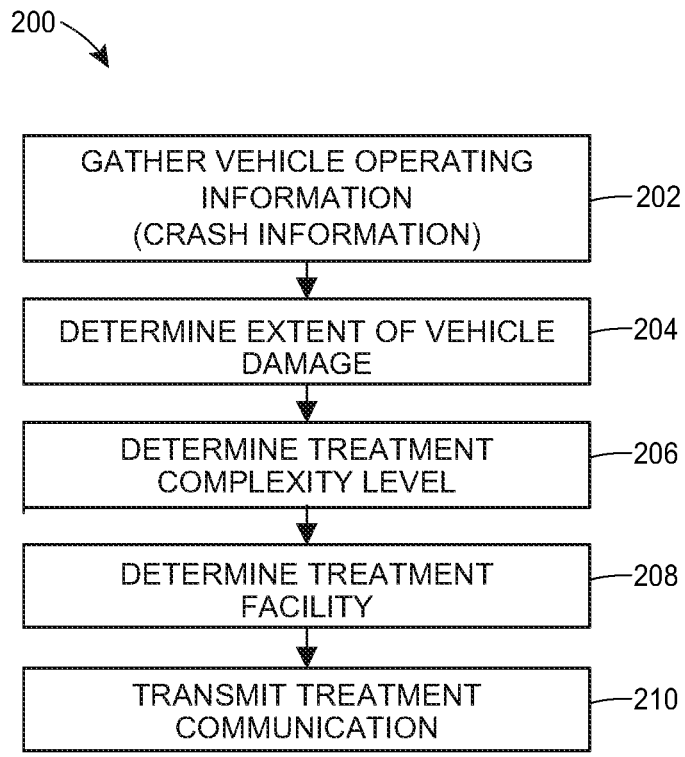
FIG. 2 depicts an example vehicle treatment process capable of being implemented in the vehicle treatment system illustrated in FIG. 1 in accordance with the presently described embodiments.

FIG. 2 is a flow diagram 200 depicting an example embodiment of a vehicle treatment process that may be implemented by the treatment system 100 shown in FIG. 1.

More particularly, the method 200 may be executed separately or cooperatively by system personnel and the processing center 102. Vehicle crash information is gathered for analysis (block 202). The vehicle crash information may be provided to system personnel and/or the processing center 102 by a vehicle occupant or emergency responder communicating characteristics of the crash. The crash characteristics may include descriptions of the approximate speed the vehicle was moving at the time of the crash, where the vehicle was damaged, the type of damage to the vehicle, whether the vehicle can be operated and/or moved, if the vehicle's airbags or other safety systems were deployed as a result of the crash, etc.

Crash characteristics may also be provided to system personnel and/or the processing center 102 by the vehicle's engine control unit (ECU) and/or one or more telematic devices that are capable of monitoring and/or noting various vehicle functions, e.g., acceleration, velocity, and/or direction of the vehicle at the time of the crash, sometimes referred to as event data recording (EDR). The telematic devices are operatively coupled to the vehicle and may be configured to automatically function when the vehicle is in operation. For example, the vehicle's operating information, e.g., acceleration, velocity, and/or direction of the vehicle, may be periodically monitored when the vehicle is moving. When a crash occurs, the monitored speed and direction of the vehicle may be automatically attained and transmitted to system personnel and/or the processing center 102 as crash characteristics.

When the crash information is received by system personnel and/or the processing center 102, the crash information is analyzed to determine an estimate of the extent of damage caused to the vehicle during the crash (block 204). The analysis may include calculating the extent of damage by comparing the crash information 104 to collision data 106. Based on the estimated vehicle damage, a treatment complexity level is determined (block 206). The treatment complexity level is an estimate indicating the level of difficulty involved with treating the damaged vehicle. The treatment of the vehicle may include repairing or replacing damaged vehicle parts, and in some instances where repairing the vehicle is too costly, scrapping the vehicle. Once the estimated treatment complexity level is determined, one or more treatment facilities capable of performing the requisite treatment may be identified by system personnel and/or the processing center (block 208). System personnel and/or the processing center 102 may then transmit a communication related to the treatment of the damaged vehicle (block 210). For example, system personnel and/or the processing center 102 may contact one or more identified treatment facilities to initiate or inquire further in regard to the continued treatment of the damaged vehicle (block 210).

Figure 3:
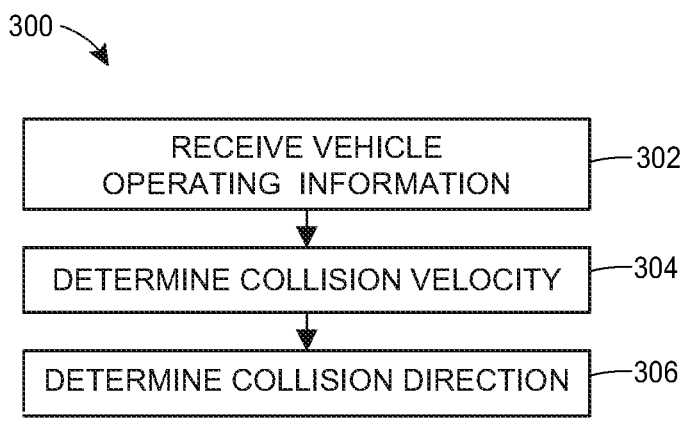
FIG. 3 depicts an example method for gathering or receiving crash information in accordance with the presently described embodiments.

A flow diagram 300 of an example embodiment for gathering vehicle crash information is depicted in FIG. 3. Crash information may be received by system personnel and/or the processing center 102 from an individual(s) present at the crash site, such as a vehicle occupant or an emergency responder (block 302). For example, the driver of the vehicle may contact system personnel and/or the processing center 102 and provide the approximate speed the vehicle was moving at the time of the crash (block 304), where the vehicle was damaged (block 306), descriptions and/or images of the damaged vehicle, whether the vehicle can be started and/or driven, if the vehicle's airbags or other safety systems were deployed as a result of the crash, etc. In addition, similar and/or additional crash information may be provided by the vehicle's EDR as well.

In treatment systems 100 where telematic devices are utilized, similar crash information may be automatically provided to system personnel and/or the processing center 102 by a computing device and/or telematic devices operatively coupled to the vehicle. In particular, while the vehicle is being operated, the vehicle's operating information may be monitored by a series of measurements of operating conditions or characteristics pertaining to the operation of the vehicle. For example, one or more computing devices such as a mobile computing device, an on-board computing device, and/or a server device may be communicatively coupled to sensors such as an accelerometer array operatively coupled to the vehicle. The accelerometer array may monitor and/or measure the acceleration of the vehicle along several axes and/or travelling directions. Measured operating information such as vehicle acceleration, velocity, and direction may be logged periodically (e.g., every millisecond, every second, etc.) or conditionally on the occurrence or detection of an event (e.g., a crash) and stored in the system 100, for example, as an event log (e.g., crash log) in a data storage unit of the system or a remote storage unit communicatively coupled to the system. The crash log may include a timestamp to note the time of the measurement. In one example configuration, system personnel and/or the processing center 102 may determine, derive, or deduce additional crash information. In particular, the vehicle acceleration at the time of the crash may be considered primary crash information, wherein additional, or secondary, crash information may include a crash velocity and/or a crash direction, which may be mathematically derived by system personnel and/or the processing center 102 from the acceleration monitored and/or measured via the accelerometer and computing device. More particularly, the system's 100 computing device(s) may monitor, via the accelerometer array, acceleration associated with the vehicle in the X, Y, and/or Z axes and create accelerometer logs. In some embodiments, the X-axis may be oriented along a front-back axis aligned with the vehicle and/or mobile and/or on-board computing device, the Y-axis may be oriented along a side-side axis aligned with the vehicle and/or mobile or on-board computing device, and the Z-axis may be oriented along a top-bottom axis aligned with the vehicle and/or mobile and/or on-board computing device. However, these axes may be positioned in other ways.

Detection of a vehicle crash may be facilitated by the use of the accelerometer. For example, a crash may be detected when a computing device operatively coupled to the accelerometer notes a significant, near immediate increase or decrease in the monitored acceleration in the fore-aft, lateral, and/or vertical direction of the vehicle, e.g., X, Y, and Z axes. Alternatively, a crash may be detected by a GPS unit via detection of a significant increase or decrease in vehicle velocity, or through near-simultaneous activation of an emergency response such as the deployment of an air-bag or an alert, e.g., automatic collision notification (ACN), etc.

Figure 4:
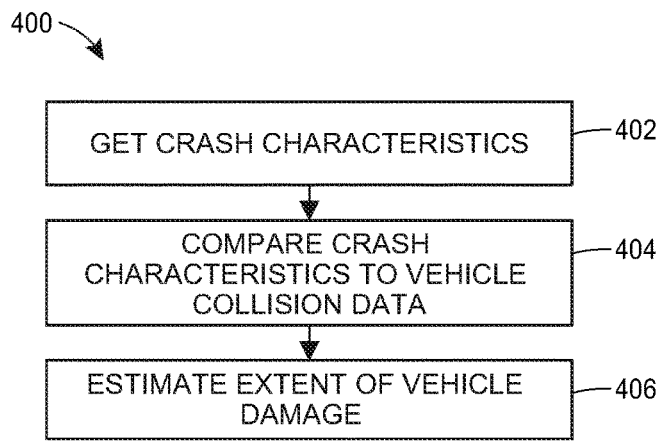
FIG. 4 depicts an example method for estimating the extent of vehicle damage in accordance with the presently described embodiments.

A flow diagram 400 of an example embodiment for estimating the extent of vehicle damage is depicted in FIG. 4. Some or all of the method for estimating the extent of vehicle damage may be implemented by system personnel and/or the processing center 102. In particular, system personnel may utilize crash characteristics provided by an individual present at the crash site, such as the driver and/or occupant of the damaged vehicle or an emergency responder (block 402). For example, descriptions and images of the damaged vehicle and an approximate speed of the vehicle at the time of the crash and the direction of where the vehicle was damaged may be provided to system personnel by the driver of the vehicle. Alternatively, system personnel and/or the processing center 102 may utilize crash characteristics automatically attained by telematic devices operatively coupled to the vehicle. Some examples of crash characteristics include, and are not limited to, vehicle acceleration, velocity, and/or direction. Some crash information may be attained by an accelerometer and an array of sensors at the time of the crash and then transmitted via a wireless communication module to system personnel and/or the processing center 102. System personnel and/or the processing center 102 may then analyze the crash information. In one example embodiment, system personnel and/or the processing center 102 may compare various combinations of crash characteristics to collision data (block 404). The collision data may include historical loss information of similar type vehicles damaged in past collisions. The collision data may be compiled from past collisions and/or from laboratory crash test results involving other vehicles of the same or similar type as the damaged vehicle. The collision data may further include one or several combinations of impact or collision characteristics that are equated and/or associated to a known amount of vehicle damage. For example, vehicle damage associated with front-end impacts at various vehicle speeds may be associated with a list of vehicle parts likely to need repair and/or replacement from such impacts. By comparing the crash characteristics of the damaged vehicle to impact and/or collision characteristics of the collision data, an extent of damage to the damaged vehicle may be estimated (block 406).

Figure 5:
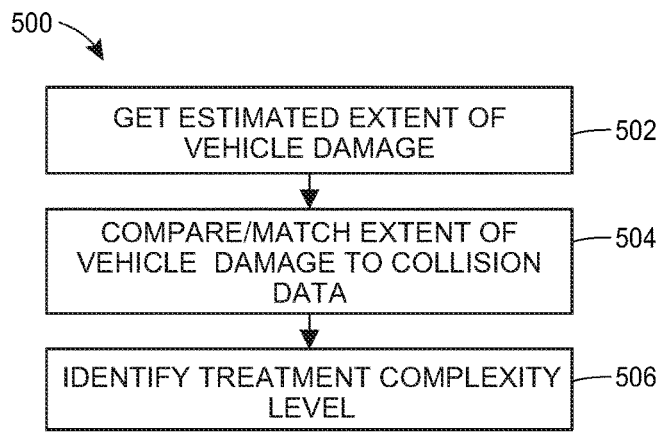
FIG. 5 depicts an example method for determining the treatment complexity level of the damaged vehicle in accordance with the presently described embodiments.

FIG. 5 depicts a flow diagram 500 of an example embodiment for estimating the treatment complexity level, which may be accomplished by system personnel and/or the processing center 102. The collision data may include a range of treatment complexity levels associated with various amounts of vehicle damage. In general, a treatment complexity level represents the difficulty associated with treating the damaged vehicle and may include or be associated with a pricing schema having a predetermined price structure for treating the damaged vehicle. A range of vehicle treatment complexity levels may be delineated by the amount of involvement associated with repairing and/or replacing vehicle parts of the damaged vehicle, or to scrap the damaged vehicle. Each treatment complexity level may include estimates or indications of the repair time and cost associated with the type and amount of vehicle body parts that may be damaged, e.g., body panel (front, side, rear, quarter-panel, rocker, driver-side, and passenger-side), bumper, radiator, lights, water pump, battery, struts, frame, and gas tank. The several levels of treatment complexity may include a speed or light repair, a medium or moderate repair, a heavy or severe repair, not repairable, scrap, and salvage, for example. A speed or light repair treatment designation may indicate or estimate that one or two vehicle parts need repair or replacement, or that minor refinishing may be required, but that no structural damage occurred to the vehicle. A medium or moderate repair treatment designation may indicate that a few vehicle parts require repair or replacement or that light structural damage occurred to the vehicle. A heavy or extensive repair treatment designation may indicate that the vehicle is not drivable, significant structural damage occurred to the vehicle, more than five vehicle parts need repair or replacement, or a welded-on vehicle component needs replacement. A scrap designation may indicate that the vehicle is to be scrapped and not repaired. Prior to scrapping, the damaged vehicle may be dismantled to salvage any undamaged or usable vehicle parts.

The estimated extent of vehicle damage attained by system personnel and/or the processing center 102 may include a list of vehicle parts estimated to be damaged (block 502). By comparing and matching the damaged list of vehicle parts to the vehicle collision data (block 504), system personnel and/or the processing center 102 may identify the requisite treatment complexity level (block 506). For example, a vehicle damage estimate requiring less than 10 hours of repair time or $1000 in vehicle parts and labor may be designated as a low treatment complexity level; a vehicle damage estimate requiring between 10-15 hours of repair time or between $1000-$2500 in vehicle parts and labor may be designated as a medium treatment complexity level; a vehicle damage estimate requiring between 15-30 hours of repair time or between $2500-$5000 in vehicle parts and labor may be designated as a high treatment complexity level; and a vehicle damage estimate requiring more than 30 hours of repair time, or having costs in vehicle parts and labor greater than the value of the damaged vehicle in an undamaged condition, may be designated as a scrapping treatment complexity level.

Figure 6:
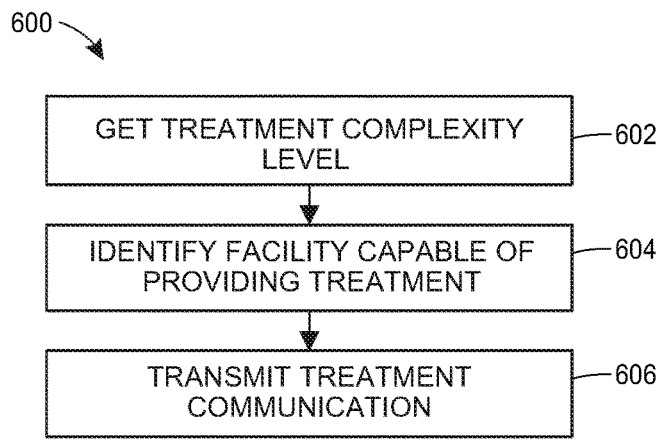
FIG. 6 depicts an example method for determining the treatment facility in accordance with the presently described embodiments.

FIG. 6 depicts a flow diagram 600 of an example method for identifying the treatment facility for treating the damaged vehicle. Once the treatment complexity level is estimated, system personnel and/or the processing center 102 may begin to determine an appropriate treatment facility for the damaged vehicle. The treatment complexity level is attained (block 602) and may be compared by system personnel and/or the processing center 102 to a list of treatment facilities that may be capable of providing the necessary treatment (block 604). Matching the estimated treatment complexity level with the treatment facilities in the list may be based on one or more factors, such as a pricing structure, treatment facility capability, treatment facility location, treatment facility quality rating and/or certification, treatment facility availability, time, etc. and combinations thereof. One or more of these factors may also be weighted and/or prioritized by system personnel and/or the processing center 102 when determining a treatment facility for treatment of the vehicle. For example, a low complexity treatment generally does not require a high skill level and the convenience of a treatment facility near the vehicle owner may be considered to be more beneficial. Thus, for a low complexity treatment, the location factor of the treatment facility may be weighted and/or prioritized over some of the other factors. For medium or high complexity treatments, the skill level and/or performance record of the treatment facility may be considered to be more important and thus weighted and/or prioritized over some of the other factors.

When a treatment facility is identified, a communication relating to the treatment of the damaged vehicle may be sent by system personnel and/or the processing center 102 (block 606). For example, the processing center 102 may transmit information associated with the treatment in the form of an SMS text, e-mail, phone call, facsimile, etc. to the identified treatment facility. The information may also be provided to the vehicle owner and/or other entities authorized by the vehicle owner, such as a collision repair facility, a vehicle scrap facility, emergency personnel, an insurance agent, etc. In addition, the information transmitted by the processing center 102 may include a request to the treatment facility or a vehicle transporter to transport the damaged vehicle to the identified treatment facility.

Figure 7:
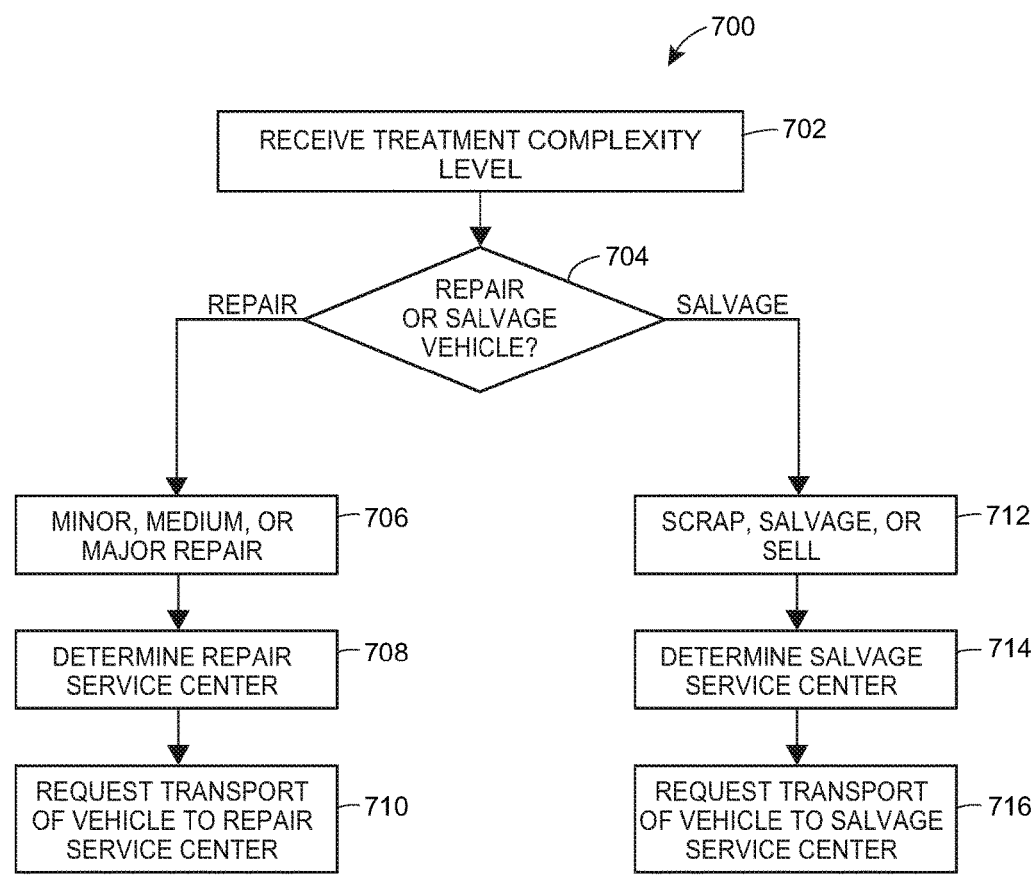
FIG. 7 depicts an example method for treating the damaged vehicle in accordance with the presently described embodiments.

Another example method for identifying the treatment facility for treating the damaged vehicle is depicted in the flow diagram 700 shown in FIG. 7. System personnel and/or the processing center 102 receive the treatment complexity level (block 702), which may then be compared to vehicle collision data. The vehicle collision data may comprise empirical data including measurements of damaged vehicles of the same or similar type to that of the vehicle damaged in the crash. Based on the comparison, a determination of the type of treatment for the damaged vehicle may be made, generally, to repair the vehicle or salvage the vehicle (block 704). The determination of the type of treatment may be made by system personnel and/or the processing center 102 comparing one or more characteristics of the damaged vehicle's crash information to a hierarchy of vehicle collision data of similar type vehicles. If the damaged vehicle is to be repaired, an extent of the repairs may be determined (block 706). The range of repair levels may vary from minor to medium to major and the range may be segmented in relation to the treatment complexity levels. In other words, one range of vehicle damages may be associated to one particular treatment complexity level.

The time and cost to repair the damaged vehicle may also be considered in the analysis to determine whether to repair or salvage the damaged vehicle. Additional factors that may also be considered in determining the treatment complexity level include the make, model, and year of the damaged vehicle, and the availability and/or market desirability for undamaged vehicle parts. For example, an older model vehicle may be more expensive to repair because replacement vehicle parts may be difficult to obtain. Once the repair level has been determined, a repair treatment facility may be selected (block 708). At a minimum, the selected repair treatment facility is capable of performing the level of repair necessary. Additional factors that may be considered when determining a repair treatment facility may include the proximity of the repair treatment facility to the damaged vehicle, e.g., collision site; the treatment facility's availability to timely repair the vehicle; and, a current or prior business relationship between the repair treatment facility and the entity using and/or administrating the treatment system 100. When the repair center is determined, information associated with the repair of the vehicle may be transmitted from system personnel and/or the processing center 102. Such information may include a request to transport the damaged vehicle from the crash site directly to the repair treatment facility (block 710). The request to transport the vehicle may be sent to the selected repair treatment facility or to a vehicle transporter 114 capable of transporting damaged vehicles from collision sites.

If the damage to the vehicle is too extensive or costly to be repaired, the damaged vehicle may be salvaged. In some instances where the damaged vehicle is determined to be a total loss, the vehicle may be immediately sold or put up for auction or scrapped and shredded for its scrap metal (block 712). Scrapping the vehicle may be appropriate for low dollar, high curb weight vehicles where the value of the damaged vehicle is perceived to be in the scrap metal. In other instances, the damaged vehicle may be dismantled to salvage any value associated with the damaged vehicle. For example, if the damaged vehicle includes undamaged vehicle parts, the vehicle may be dismantled and the undamaged vehicle parts may be harvested and stored in a storage facility 116 for later use and/or sale. The determination to sell or dismantle the damaged vehicle may include consideration of the treatment complexity level, the make, model, and year of the vehicle, and the market demand and/or desirability of particular harvested vehicle parts, e.g., at-risk vehicle parts for vehicles that are no longer in production. Additionally, a higher monetized recovery of the damaged vehicle may be attained if the damaged vehicle is partially repaired and/or dismantled to a varying extent, and then sold. For example, higher end and late model vehicles and/or vehicle parts may be prepared for sale. Such vehicles and vehicle parts, as well as rare or hard to find vehicles and vehicle parts may be privately or publicly sold or auctioned through a salvage treatment facility partnering with an entity using or administrating the treatment system 100. Any unwanted vehicle parts that remain after dismantling may be shredded or scrapped. Once the salvage level has been determined, a salvage treatment facility may be identified from among the salvage treatment centers (block 714). At a minimum, the selected salvage treatment facility is capable of performing the level of salvage necessary. Additional factors may also be considered to determine a particular salvage treatment facility. For example, the proximity of the salvage treatment facility to the damaged vehicle, e.g., crash site. Further considerations for determining a salvage treatment facility may also include the availability to timely salvage the vehicle, the existence of a current or prior business relationship between the salvage treatment facility and the entity using or administrating the treatment system 100, etc. When the salvage treatment facility is determined, information associated with the salvage of the vehicle may be transmitted by system personnel and/or the processing center 102. Such information may include a request to transport the vehicle to the identified salvage treatment facility (block 716). The request to transport the vehicle may be sent to the selected salvage treatment facility 112 or to a vehicle transporter 114 capable of transporting the damaged vehicle from the collision site to the salvage treatment facility.

Figure 8:
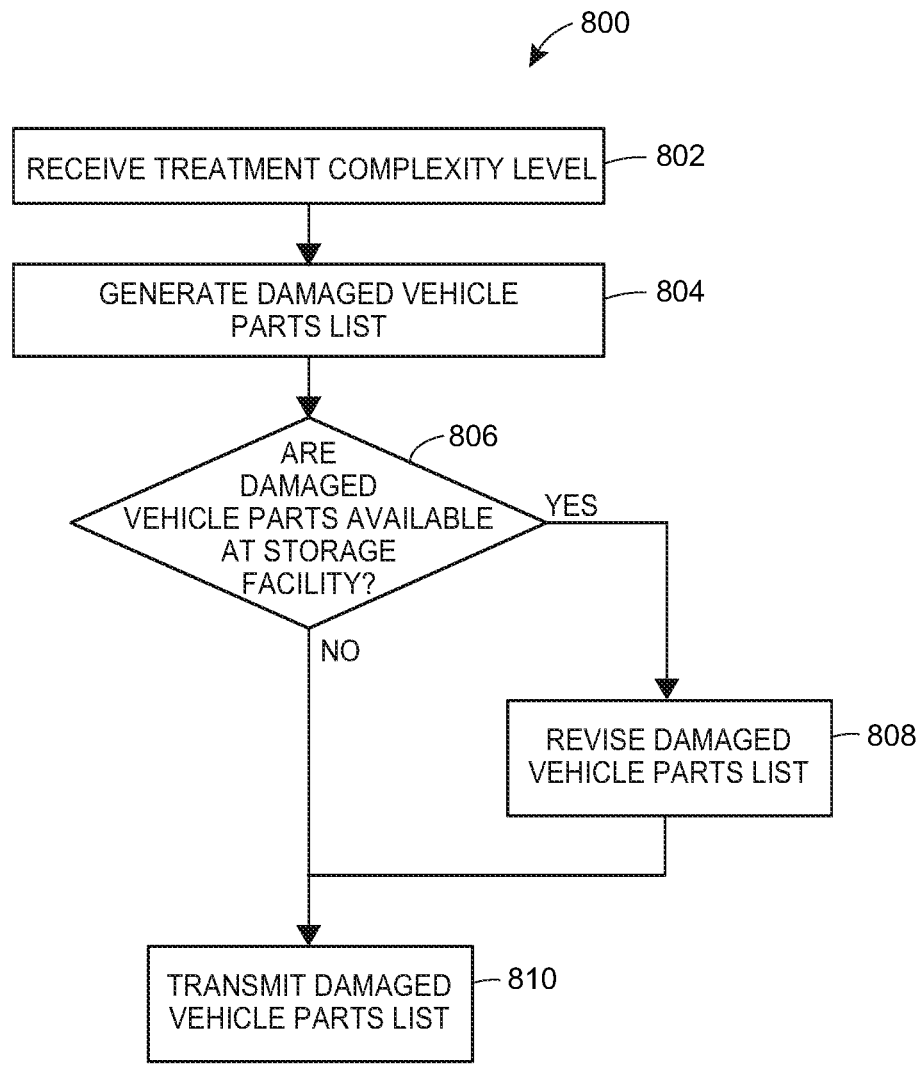
FIG. 8 depicts another example method for treating the damaged vehicle in accordance with the presently described embodiments.

To further facilitate the treatment of the damaged vehicle, additional information may also be transmitted by system personnel and/or the processing center 102 of the treatment system 100. In some instances, a request for a quote to treat the damaged vehicle may be generated and sent to selected treatment facilities, e.g., repair or salvage centers. An example process for including information related to the damaged vehicle with the request for a quote to treat the damaged vehicle is illustrated in the flow diagram 800 shown in FIG. 8. The request for a quote to repair the damaged vehicle may be generated based in part on the vehicle treatment complexity level (block 802) received by system personnel and/or the processing center 102 and/or any other information, such as the make, model, and year of the damaged vehicle, as well as a time and/or monetary limitation. In particular, a list of damaged vehicle parts may be generated (block 804) by system personnel and/or the processing center 102 and sent to a prospective treatment facility, a prospective vehicle parts supplier, and/or the vehicle owner (block 810). The generated list of damaged vehicle parts may include a list of vehicle parts likely to have been damaged in the crash as reflected by the vehicle treatment complexity level and may be sent along with a request for a quote to repair the damaged vehicle. The quotes received from the various entities may be analyzed and compared by system personnel and/or the processing center 102 to select a repair treatment facility for repairing the damaged vehicle. Such analyses may consider the time to repair the damaged vehicle, the work quality history of the repair treatment facility, etc.

Prior to requesting quotes for repairing the damaged vehicle, system personnel and/or the processing center 102 may compare the list of damaged vehicle parts to an inventory list of undamaged vehicle parts stored at a storage facility 116 or storage center (block 806). The undamaged vehicle parts stored in the storage facility 116 may have been harvested from previously scrapped or salvaged vehicles. System personnel and/or the processing center 102 may revise the list of damaged vehicle parts to indicate any vehicle parts that are available at the storage facility 116 (block 808). A repair treatment facility quoting to repair the damaged vehicle may then utilize the information from the damaged vehicle parts list in its quote for repairing the damaged vehicle. For example, the prospective repair centers may be provided the opportunity to purchase one or more vehicle parts stored at the storage facility in its repair quote. Additionally, the cost and availability of a particular vehicle part stored at the storage facility may also be presented to the vehicle owner in the form of the damaged vehicle parts list and the like with the opportunity to select and purchase a particular vehicle part from the storage facility 116. The vehicle owner may select and purchase all, none, or some of the vehicle parts held in the storage facility 116.

Figure 9:
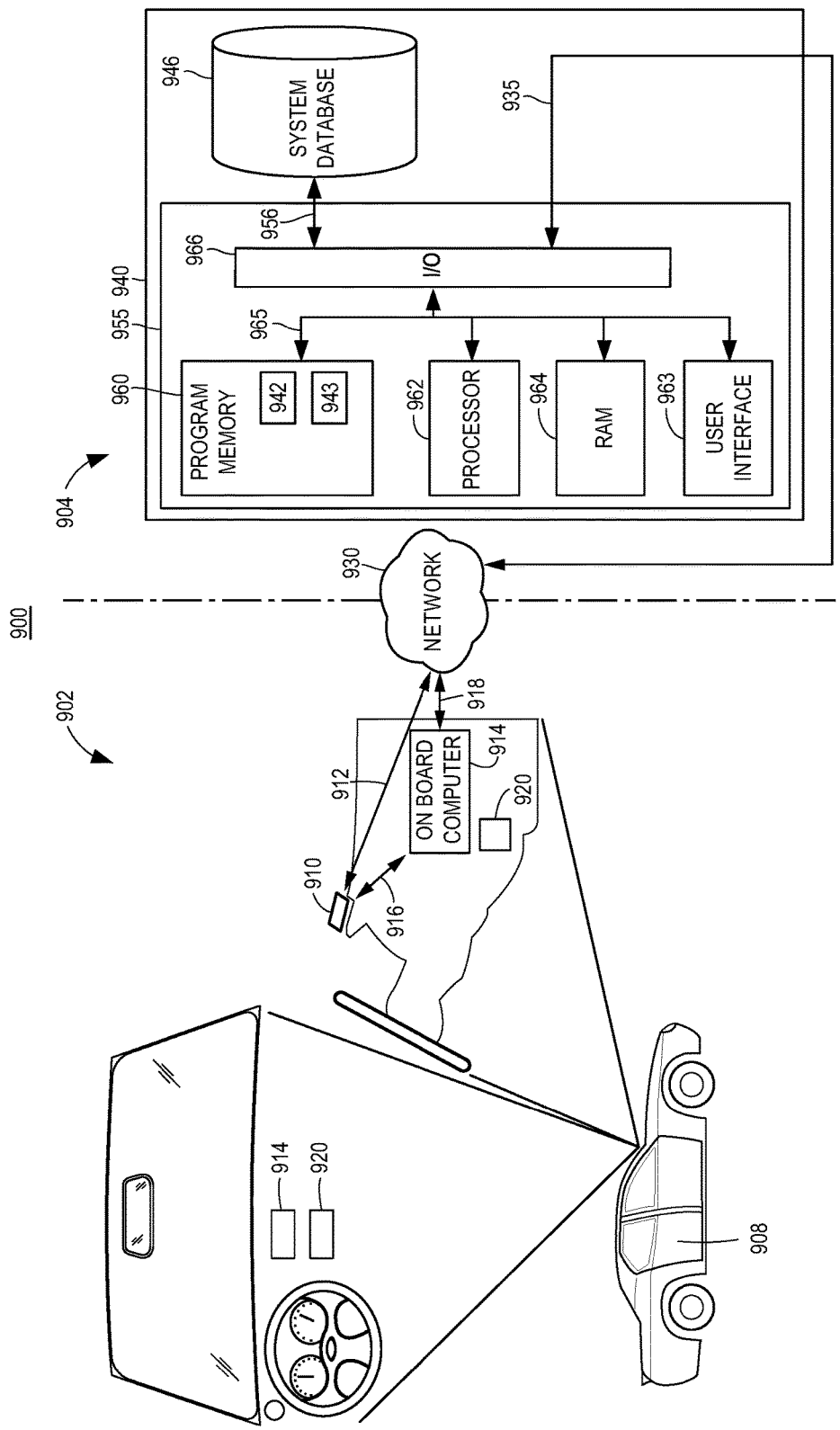
FIG. 9 is a block diagram depicting a mobile computing device, an on-board computing device, a server device, and a communication network that may configured in the example system for treating a damaged vehicle in accordance with the described embodiments.

FIG. 9 illustrates a block diagram of an example treatment system 900 capable of being incorporated into the treatment system 100 shown in FIG. 1 and supporting the processes described herein for treating a vehicle damaged in a crash. The high-level architecture of the vehicle treatment system 900 includes both hardware and software applications, as well as various data communications channels for communicating data between the various hardware and software components. The vehicle treatment system 900 may be divided into front-end components 902 and back-end components 904. The front-end components 902 include one or more computing devices, such as a mobile computing device 910 and/or an on-board computing device 914. Either computing device 910, 914 may be permanently or removably attached to a vehicle 908 and may interface with various sensors coupled to the vehicle 908 (e.g., a speedometer, an accelerometer, a compass, a global position unit (GPS), etc.) and/or may interface with various external output devices in the vehicle 908, such as one or more tactile alert systems, one or more speakers, one or more displays, etc.

Each of the mobile computing device 910 and the on-board computing device 914 is capable of performing all of the functions of the computing device described herein or may supplement the functions performed by the other computing device. The mobile computing device 910 and on-board computing device 914 may communicate with one another directly over a wired or wireless link 916. In addition, the mobile computing device 910 and the on-board computing device 914 may communicate with a network 930 over wired or wireless links 912, 918, respectively. The network 930 may be a proprietary network, a secure public internet, a virtual private network, or some other type of network, such as dedicated access lines, plain ordinary telephone lines, satellite links, etc., and combinations thereof. Where the network 930 comprises the internet, data communications may take place over the network 930 via an internet communication protocol.

The treatment system 900 may also include a notification alert system 920 (e.g., automatic collision notification (ACN), advanced automatic collision or crash notification (AACN), event data recorder (EDR)), that may record and/or transmit information associated with treating the vehicle 908 after being involved in a crash. The front-end components 902 and the back-end components 904 communicate via the communication network 930. The back-end components 904 include a computing device such as a server 940 device or system. The server device 940 may include one or more processors 962 adapted and configured to execute various software applications and/or modules of the vehicle treatment system 900, in addition to other software routines. The server device 940 may further include a database 946 adapted to store the various software applications, modules, and/or routines as well as data related to the operation of the vehicle treatment system 900. The data may include, for example, information collected by the mobile computing device 910 and/or the on-board computing device 914 pertaining to the vehicle treatment system 900 and uploaded to the server device 940, such as sensor inputs, analyses corresponding to the methods discussed above, and images. Other kinds of information that may be stored in the database may include historical vehicle collision data compiled from crash data involving vehicles categorized in the same or similar type of vehicle as the vehicle 908 and contact information relating to vehicle service repair and/or salvage treatment facilities, part suppliers, vehicle transporters, vehicle owner, insurance personnel, etc. The computing devices 910, 914 and/or server device 940 may access or store data and/or software applications in the database 946 when executing various functions and tasks associated with the operation of the vehicle treatment system 900.

Although the vehicle treatment system 900 is shown to include one server device 940, one mobile computing device 910, and one on-board computing device 914, it should be understood that additional server devices 940, mobile computing devices 910, and on-board computing devices 914 may be utilized. For example, the system 900 may include several server devices 940 and numerous mobile computing devices 910, all of which may be interconnected via the network 930. As discussed above, the mobile computing device 910 may perform the various functions described herein in conjunction with the on-board computing device 914 or alone. Likewise, the on-board computing device 914 may perform the various functions described herein in conjunction with the mobile computing device 910 or alone. In either instance, the mobile computing device 910 or on-board computing device may not need to be present. Furthermore, the processing performed by the one or more server devices 940 may be distributed among a plurality of server devices 940 configured in an arrangement known as "cloud computing." This arrangement may provide several advantages, such as, for example, enabling near real-time uploads and downloads of information as well as periodic uploads and downloads of information. This arrangement may provide for a thin-client embodiment of the mobile computing device 910 and/or on-board computing device 914 described herein as well as a primary backup of some or all of the data gathered by the mobile computing device 910 and/or on-board computing device 914. All of the information involved with the treatment system 100, for example, crash information, collision data, VIN data, images, historical loss information, damage evaluation tools, damaged vehicle parts list, inventory of vehicle parts stored at the storage facility, vehicle transporters, treatment centers, customer contact information, insurance agent/entity contact information, etc. may be displayed in a variety of formats at the server device 940, wherein system personnel and/or the processing center 102 is provided access to such information for treating the damaged vehicle.

The server device 940 may have a controller 955 that is operatively connected to the database 946 via a link 956. The controller 955 may also be operatively connected to the network 930 via a communication link 935. It should be noted that, while not shown, additional databases may be linked to the controller 955 in a known manner. The controller 955 may include a program memory 960, a processor 962 (e.g., a microprocessor or a microcontroller), a random-access memory (RAM) 964, input/output (I/O) circuitry 966, and a user interface module 963 all of which may be interconnected via an address/data bus 965. The user interface module 963 facilitates human-to-machine interaction and may include a display screen, keyboard, mouse device, microphone, speaker, etc. Although the I/O circuitry 966 is shown as a single block, the I/O circuitry 966 may include a number of different types of I/O circuits. The program memory 960 may be configured to store computer-readable instructions that when executed by the processor 962 cause the server device 940 to implement a server application 942 and/or a web server 943. The instructions for the server application 942 may cause the server device 940 to implement the methods described herein. While shown as a single block in FIG. 9, it will be appreciated that the server application 942 may include a number of different programs, modules, routines, sub-routines, etc., that may separately or collectively cause the server device 940 to implement the server application 942. It should also be appreciated that although only one processor 962 is shown, the controller 955 may include multiple processors and/or microprocessors. Similarly, the memory of the controller 955 may include multiple RAMs 964 and multiple program memories 960. The RAM(s) 964 and program memories 960 may be implemented as semiconductor memories, magnetically readable memories, and/or optically readable memories, for example. Further, while the instructions for the server application 942 and web server 943 are shown being stored in the program memory 960, the instructions may additionally or alternatively be stored in the database 946 and/or RAM 964.

Alternatively, the vehicle treatment system 900 may include only the front-end components 902. For example, a mobile computing device 910 and/or on-board computing device 914 may perform any and/or all of the processing associated with compiling or gathering crash information, determining a treatment complexity level based on the crash information, determining a treatment for the vehicle based on the a treatment complexity level; and transmitting information associated with the treatment of the vehicle.

Figure 10:
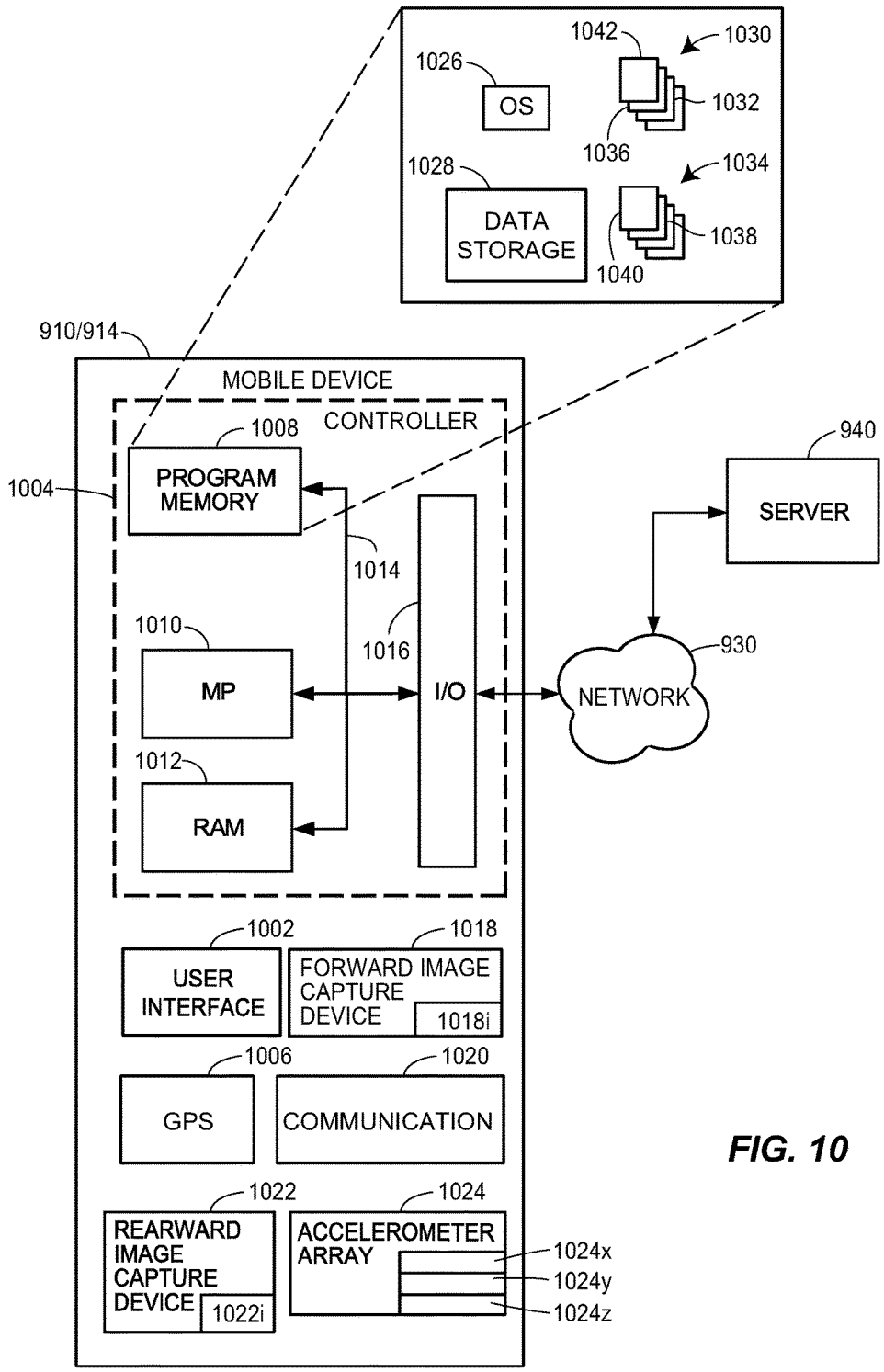
FIG. 10 is a block diagram of an example mobile computing device, on-board computing device, and/or server device capable of being implemented in the system shown in FIG. 9.

Referring now to FIG. 10, the mobile computing device 910 may include a user interface module 1002, a positioning module 1006 such as a global positioning system (GPS) module, a communication module 1020, a forward image capture module 1018, a rearward image capture module 1022, an accelerometer array 1024, and a controller 1004. Similarly, the on-board computing device 914 may include a user interface module 1002, a GPS module 1006, a communication module 1020, a forward image capture module 1018, a rearward image capture module 1022, an accelerometer array 1024, and a controller 1004.

The mobile computing device 910 and on-board computing device 914 may be integrated into a single device that can perform the functions of both devices. It will be appreciated that functions performed by either the mobile computing device 910 or the on-board computing device 914 may also be performed by the on-board computing device 914 in cooperation with the mobile computing device 910. The mobile computing device 910 may be a general-use mobile personal computer, cellular phone, smartphone, tablet computer, wearable computer (e.g., a watch, glasses, etc.), or a device dedicated to facilitating treatment of a damaged vehicle. The on-board computing device 914 may be a general-use on-board computer capable of performing the functions relating to vehicle operation or dedicated to facilitate treatment of a damaged vehicle. The on-board computing device 914 may be installed by the manufacturer of the vehicle 908 or as an aftermarket modification to the vehicle. Further, the mobile computing device 910 and/or on-board computing device 914 may be a thin-client device that outsources some or most processing to the server device 940.

Similar to the controller 955, the controller 1004 includes a program memory 1008, a microprocessor (MP) 1010, a random-access memory (RAM) 1012, and input/output (I/O) circuitry 1016, all of which are interconnected via an address/data bus 1014. Although the I/O circuitry 1016 is depicted in FIG. 10 as a single block, the I/O circuitry 1016 may include a number of different types of I/O circuits. The program memory 1008 includes an operating system 1026, a data storage device 1028, a plurality of software applications 1030, and a plurality of software routines 1034. The operating system 1026 may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 1028 may include application data for the plurality of applications 1030, routine data for the plurality of routines 1034, and other data necessary to interact with the server 940 through the network 930. In particular, the data storage device 1028 may include vehicle collision data associated with a vehicle type that includes the vehicle 908. The vehicle type may include the make, model, and year of the vehicle. The vehicle collision data may include one or more compilations of recorded measurements of damaged vehicle parts and components and the corresponding acceleration and derived vectors, e.g., velocity and direction, of such characteristics attributed for the damage. In some embodiments, the controller 1004 may also include, or otherwise be operatively coupled for communication with other data storage mechanisms (e.g., one or more hard disk drives, optical storage drives, solid state storage devices, etc.) that may reside within the mobile computing device 910 and/or on-board computer 914 or operatively coupled to the network 930 and/or server device 940.

The GPS module 1006 may use "Assisted GPS" (A-GPS), satellite GPS, or any other suitable global positioning protocol or system that locates vehicle 908 via the position of the mobile computing device 910 and/or on-board computing device 914. For example, A-GPS utilizes terrestrial cell phone towers or Wi-Fi hotspots (e.g., wireless router points) to more accurately and more quickly determine the location of the vehicle 908 via the mobile computing device 910 and/or on-board computing device 914 while satellite GPS is generally more useful in more remote regions that lack cell towers or Wi-Fi hotspots. The GPS module 1006 may also facilitate the determination of the velocity and direction of the vehicle 908, via the coupling of the mobile computing device 910 and/or on-board computing device 914 to the vehicle.

The accelerometer array 1024 is one example of a telematic device or module that may incorporate one or more accelerometers positioned to determine the acceleration and direction of movements of the mobile computing device 910 and/or on-board computing device 914, which effectively correlate to the acceleration and direction of movements of the vehicle 908. In some embodiments, the accelerometer array 1024 may include an X-axis accelerometer 1024x, a Y-axis accelerometer 1024y, and a Z-axis accelerometer 1024z to measure the acceleration and direction of movement in each respective dimension. It will be appreciated by those of ordinary skill in the art that a three dimensional vector describing a movement of the vehicle 908 via the mobile computing device 910 and/or on-board computing device 914 through three dimensional space can be established by combining the outputs of the X-axis, Y-axis, and Z-axis accelerometers 1024x, y, z using known methods. Single- and multi-axis models of the accelerometer 1024 are capable of detecting magnitude and direction of acceleration as a vector quantity, and may be used to sense orientation and/or coordinate acceleration of the vehicle 908.

The forward and rearward image capture module 1018, 1022 may be built-in cameras within the mobile computing device 910 and/or on-board computing device 914 and/or may be peripheral cameras, such as webcams, cameras installed inside the vehicle 908, cameras installed outside the vehicle 908, etc., that are communicatively coupled with the mobile computing device 910 and/or on-board computing device 914. The image capture module 1018, 1022 may be oriented toward the front and rear of the vehicle 908. For example, the forward image capture module 1018 may be oriented toward the front of the vehicle 908 to observe the forward area of the vehicle 908 while the rearward image capture module 1022 may be oriented toward the rear of the vehicle 908 to observe the rearward area of the vehicle 908, or vice-versa. Some embodiments of the treatment system 900 may have both a forward image capture module 1018 and a rearward image capture module 1022, but other embodiments may have only one or no image capture module. Further, either or both of the forward image capture module 1018 and the rearward image capture module 1022 may include an infrared illuminator 1018i, 1022i, respectively, to facilitate low light and/or night image capturing. Such an infrared illuminator 1018i, 1022i may be automatically activated when light is insufficient for image capturing.

The GPS module 1006, the image capture modules 1018, 1022, and the accelerometer array 1024 may be referred to collectively as the "sensors" of the mobile computing device 910 and/or on-board computing device 914. Of course, it will be appreciated that additional GPS modules 1006, image capture modules 1018, 1022, and/or the accelerometer arrays 1024 may be operatively coupled to the mobile computing device 910 and/or on-board computing device 914. Further, the mobile computing device 910 and/or on-board computing device 914 may also include or be coupled to other sensors such as a thermometer, microphone, thermal image capture device, biomedical sensor, etc. The microphone may be incorporated with the user interface module 1002 and used to receive voice inputs from the vehicle operator while the thermometer and/or thermal image capture device may be used to determine fire or heat damage to the vehicle 908, and the biomedical sensor may capture biological characteristics of the vehicle operator.

The communication module 1020 may communicate with the server device 940 via any suitable wired or wireless communication protocol network, such as a wireless telephony network (e.g., GSM, CDMA, LTE, etc.), a Wi-Fi network (802.11 standards), a WiMAX network, a Bluetooth network, etc. The communication unit 1020 may also be capable of communicating using a near field communication standard (e.g., ISO/IEC 18092, standards provided by the NFC Forum, etc.).

The mobile computing device 910 and/or on-board computing device 914 may include the user-input interface 1002, which may include a "soft" keyboard that is presented on a display screen of the mobile computing device 910 and/or on-board computing device 914, an external hardware keyboard communicating via a wired or a wireless connection (e.g., a Bluetooth keyboard), and an external mouse, or any other suitable user-input device or component (see examples in FIGS. 10-13). As described earlier, the user-input module 1002 may also include a microphone (not shown) capable of receiving voice input from a vehicle operator as well as a display screen.

With reference to the controllers 955, 1004, it should be appreciated that although FIG. 10 depicts only one microprocessor 1010, the controller 1004 may include multiple microprocessors 1010. The memory of the controller 1004 may also include multiple RAMs 1012 and multiple program memories 1008. The controller 1004 may implement the RAM 1012 and the program memories 1008 as semiconductor memories, magnetically readable memories, and/or optically readable memories, for example. The one or more processors 1010 may be adapted and configured to execute any of the plurality of software applications 1030 and/or any of the plurality of software routines 1034 residing in the program memory 1008, in addition to other software applications. One of the plurality of applications 1030 may be a client application 1032 that may be implemented as a series of machine-readable instructions for performing the various functions associated with implementing the vehicle treatment system 900 as well as receiving information at, displaying information on, and transmitting information from the mobile device 910 and/or the on-board computing device 914. A client application 1032 may function to implement a system wherein the front-end components 902 communicate and cooperate with back-end components 904 as described above. The client application 1032 may include machine-readable instructions for implementing the user interface 1002 to allow a user to input commands to, and receive information from, the vehicle treatment system 900. One of the plurality of applications 1030 may be a native web browser 1036, such as Apple's Safari Google Android™ mobile web browser, Microsoft Internet Explorer® for Mobile, Opera Mobile™, that may be implemented as a series of machine-readable instructions for receiving, interpreting, and displaying web page information from the server device 940 or other back-end components 904 while also receiving inputs from the vehicle operator. Another application of the plurality of applications may include an embedded web browser 1042 that may be implemented as a series of machine-readable instructions for receiving, interpreting, and displaying web page information from the server device 940 or other back-end components 904 within the client application 1032.

Another of the plurality of client applications 1030 or routines 1034 may include an accelerometer routine 1038 that determines the acceleration and direction of movements of the mobile computing device 910 and/or on-board computing device 914, which correlate to the acceleration and direction of the vehicle 908. The accelerometer routine may process data from the accelerometer array 1024 to determine one or more vectors describing the motion of the vehicle 908 for use with the client application 1032. In some embodiments where the accelerometer array 1024 has X-axis, Y-axis, and Z-axis accelerometers 1024x,y,z, the accelerometer routine 1038 may combine the data from each accelerometer 1024x,y,z to establish the vectors describing the motion of the vehicle 908 as it moves through three dimensional space. In some embodiments, the accelerometer routine 1038 may use data pertaining to less than three axes.

Another routine in the plurality of applications 1030 or routines 1034 may include a vehicle velocity routine 1040 that coordinates with the GPS module 1006 to retrieve vehicle velocity and direction information for use with one or more of the plurality of applications, such as the client application 1032, or for use with other routines.

Yet another routine in the plurality of applications 1030 or routines 1034 may include an image capture routine that coordinates with the image capture modules 1018, 1022 to retrieve image data for use with one or more of the plurality of applications, such as the client application 1032, or for use with other routines.

The user or vehicle operator may also launch or instantiate any other suitable user interface application (e.g., the native web browser 1036, or any other one of the plurality of software applications 1030) to access the server device 940 to implement the vehicle treatment system 900. Additionally, the user or vehicle operator may launch the client application 1032 from the mobile computing device 910 and/or on-board computing device 914, to access the server device 940 to implement the vehicle treatment system 900.

After the vehicle operating information (e.g., acceleration, velocity, and direction) has been gathered or determined by the sensors or the mobile computing device 910 and/or on-board computing device 914, previously recorded collision data may be utilized to determine the extent of damage to the vehicle 908 involved in a crash. Once the extent of the damage has been assessed, a treatment for the vehicle 908 can be determined. For example, the mobile computing device 910 and/or on-board computing device 914 may determine that the damaged vehicle can be repaired or scrapped, and where the damaged vehicle may be taken for such treatment. The mobile computing device 910 and/or on-board computing device 914 may also transmit information associated with the treatment of the damaged vehicle. For example, the transmitted information may be sent to a treatment facility capable of performing the treatment and/or the information may be sent to a transportation facility and include a request to transport the damaged vehicle to the treatment facility.

In embodiments where the mobile computing device 910 and/or on-board computing device 914 is a thin-client device, the server device 940 may perform many of the processing functions remotely that may otherwise be performed by system personnel and/or the mobile computing device 910 and/or on-board computing device 914. In such embodiments, the server device 940 may include a number of software applications capable of receiving vehicle operating information gathered by the sensors and/or acquiring collision data to be used in determining the extent of damage to the vehicle 908 involved in the crash. For example, the mobile computing device 910 and/or on-board computing device 914 may gather information from its sensors as described herein, but instead of using the information locally, the mobile computing device 910 and/or on-board computing device 914 may send the information to the server device 940 for remote processing. The server device 940 may perform the analysis of the gathered crash information to determine the amount of damage to the vehicle 908 as described herein. The server device 940 may then determine whether the damaged vehicle can be repaired or scrapped, and where the damaged vehicle may be taken for such treatment. The server device 940 may also transmit information associated with the treatment of the damaged vehicle. For example, the information transmitted by the server device 940 may be sent to a treatment facility and/or a transport facility and include a request to transport the damaged vehicle to the treatment facility, or the server device 940 may transmit the information to the mobile computing device 910 and/or on-board computing device 914.

FIGS. 11-14 depict application pages that may be presented on the user interface 1002 of the mobile computing device 910 as part of the user interface used to implement the vehicle treatment system 900. While FIGS. 11-14 depict pages or screens of information capable of being presented on the display 1002 of the mobile computing device 910, it is to be understood that the application pages or screens of information could be displayed on the display 1002 of the on-board computing device 914 in addition to being displayed on the mobile device 910 or as an alternative. In addition, the application pages may also be displayed on the user interface 963 of the server device 940. The applications or pages may be generated by the mobile computing device 910/914 or sent to the mobile computing device 910/914 by the server 940 (e.g., as with a thin client). The user may launch the application from the mobile computing device 910/914 via any suitable manner, such as touch-selecting a start application icon 1104 on the display 1002 of the mobile computing device 910/914 or speaking a voice command into the microphone (not shown) of the mobile computing device 910/914. After the user launches the application 1032, the application 1032 may begin to run on the mobile computing device 910/914 as described above in connection to block 202, FIG. 2; or the mobile computing device 910 may communicate with the on-board computing device 914 and the client application 1032 may begin to run on the on-board computing device 914.

With reference now to FIG. 11, a monitor screen 1100 of the client application and/or routine may be displayed on the screen of the mobile computing device 910/914. The monitor screen 1100 may include a 'Calibrate" tab 1102, a "Start" tab 1104, a "Settings" tab 1106, and a 'Report' tab 1108. When the user selects the "Calibrate" tab 1102, the client application may execute a calibration routine. A calibration screen (not shown) may be displayed on the screen of the mobile computing device 910/914 during execution of the calibration routine, wherein the progress of the calibration routine may be indicated by an illustration showing the approximate status of the calibration routine. If desired, a user may cancel the calibration and/or set the calibration routine to run in the "background," so as not to appear on the screen 1100 of the mobile computing device 910/914.

When the user selects the "Start" tab 1104, the client application may begin to monitor and collect data about vehicle operation. The collected data may be stored as described above and/or additional data may be mathematically determined from the collected data about vehicle operation and also stored. Once started, a vehicle monitor screen 1200 shown in FIG. 12 may be displayed on the screen of the mobile computing device 910/914. The vehicle monitor screen 1200 may include a "Stop" tab 1202. If the "Stop" tab 1202 is selected by the user, the vehicle treatment system 900 will terminate vehicle operation monitoring. The vehicle treatment system 900 may also be stopped by a voice command of the user. Alternatively, the vehicle treatment system 900, e.g., gathering and analyzing of the vehicle operation and/or collision data, may be ceased by the mobile computing device 910/914 detecting that the engine of the vehicle 908 has stopped.

Figure 13:
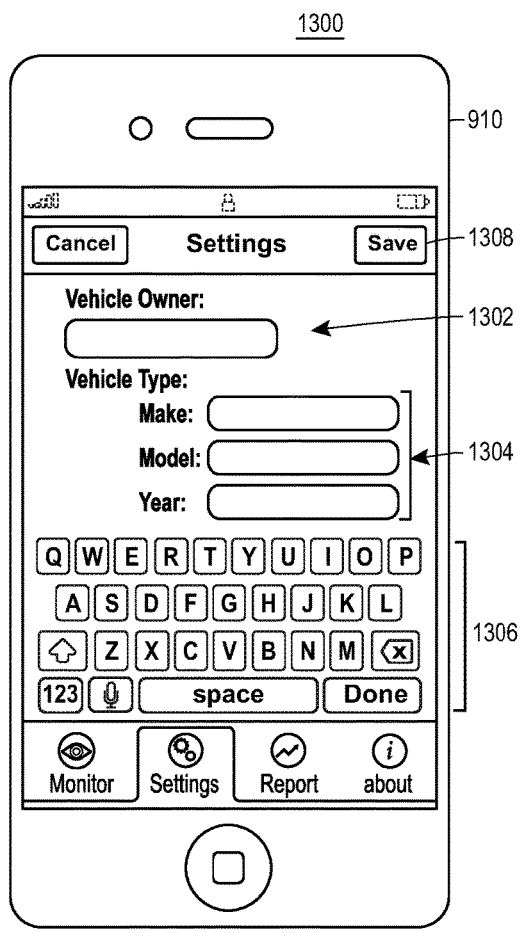

Referring now to FIG. 13, when the user selects the "Settings" tab 1106 shown in FIG. 11, a settings screen 1300 may be displayed on the screen of the mobile computing device 910/914. The settings screen 1300 may include a variety of information that the user or vehicle operator may enter into the vehicle treatment system 900 via a "soft" keyboard 1306 of the user interface of the mobile computing device 910/914. Such information may include the vehicle owner's name and/or contact information 1302. Additional information may include the make, model, and year of the vehicle type 1304 of the vehicle 908 that will be utilized with the treatment system 900. The settings screen 1300 may also include a variety of parameters that may be entered and adjusted by the user, such as the mode for turning on the treatment system 900, i.e., manual or automatic, etc. The parameters may be modified and saved by the user or vehicle operator via selection of a "Save" tab 1308 of the user interface on the mobile computing device 910/914.

Figure 14:
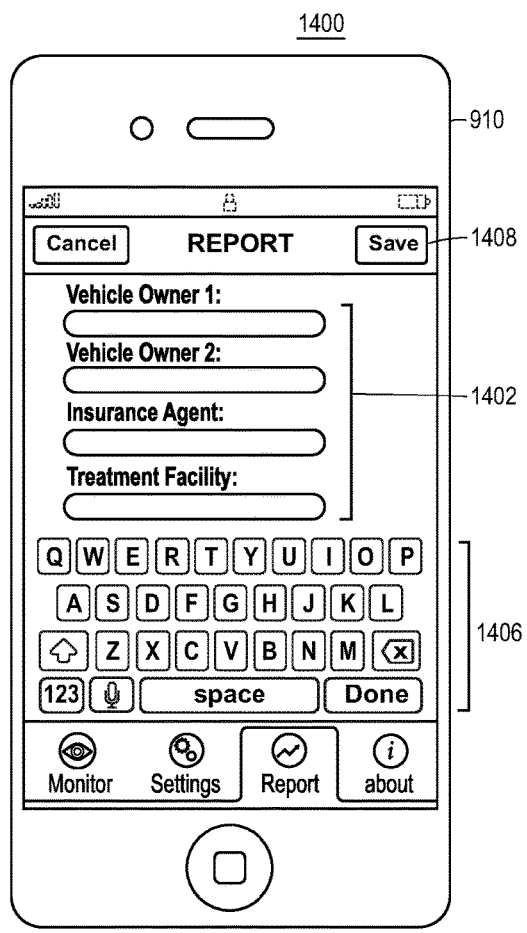

Referring now to FIG. 14, when the user selects the "Report" tab 1108 shown in FIG. 11, a report screen 1400 may be displayed on the screen of the mobile device 910/914. The report screen 1400 may include a list of contacts 1402 to be notified in the event of a crash. The contact list 1402 may include the vehicle owner, insurance agent, etc., and may be entered and/or modified by the user via a "soft" keyboard 1406 of a user interface of the mobile computing device 910. The list of contacts 1402 may be saved by the user or vehicle operator via selection of the "Save" tab 1408 of the user interface of the mobile computing device 910.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed:

1. A method implemented on a computer system including one or more processors for treating a vehicle damaged in a crash, the method comprising:

providing a plurality of indications of treatment facilities;

assigning a treatment complexity level to each of the plurality of indications of treatment facilities, the treatment complexity level representing a degree of difficulty associated with treating damaged vehicles, including repairing, salvaging, or scrapping;

storing, by the one or more processors, each of the plurality of indications of treatment facilities and the assigned treatment complexity level;

receiving, by the one or processors via one or more sensors coupled to the damaged vehicle, crash information about a damaged vehicle, the crash information including vehicle operating data of the damaged vehicle near or at the time of the crash;

evaluating, by the one or more processors, the received crash information with collision data of a vehicle type that includes the damaged vehicle;

determining, by the one or more processors, the treatment complexity level associated with treating the damaged vehicle based on the evaluation of the received crash information;

selecting, by the one or more processors, the treatment facility for treating the damaged vehicle based on the stored indications of treatment facilities and assigned treatment complexity levels corresponding to the determined treatment complexity level of the damaged vehicle; and transmitting, by the one or more processors, information associated with treating the damaged vehicle.

2. The method of claim 1, wherein transmitting information associated with treating the damaged vehicle includes transmitting information associated with transporting the damaged vehicle to the selected treatment facility.

3. The method of claim 1, wherein evaluating the received crash information includes comparing an operating characteristic of the damaged vehicle with an impact characteristic of the vehicle type that includes the damaged vehicle.

4. The method of claim 1, wherein evaluating the received crash information includes comparing an image of the damaged vehicle to a like image of another vehicle of similar type to that of the damaged vehicle.

5. The method of claim 1, wherein receiving crash information about a damaged vehicle includes receiving a description of the damaged vehicle.

6. The method of claim 5, wherein the description of the damaged vehicle includes an auditory and/or a visual description.

7. A computer system for treating a vehicle damaged in a crash, the computer system comprising:

a computing device including one or more processors;

one or more memory devices coupled to the one or more processors of the computing device, the one or more memory devices storing executable instructions that when executed by the one or more processors of the computing device cause the computer system to assign a treatment complexity level to each of a plurality of indications of treatment facilities, store each of the plurality of indications of treatment facilities and the assigned treatment complexity level, receive crash information near or at the time of the crash and including vehicle operating data of a damaged vehicle from one or more sensors coupled to the damaged vehicle, evaluate the received crash information of the damaged vehicle with collision data of a vehicle type that includes the damaged vehicle and determine the treatment complexity level associated with treating the damaged vehicle based on the evaluation of the crash information;

select the treatment facility for treating the damaged vehicle based on the stored indications of treatment facilities and assigned treatment complexity levels corresponding to the determined treatment complexity level of the damaged vehicle; and transmit information associated with treating the damaged vehicle.

8. The computer system of claim 7, wherein the information associated with treating the damaged vehicle includes information associated with transporting the damaged vehicle to the selected treatment facility.

9. The computer system of claim 7, wherein the received crash information about the damaged vehicle includes a description of the damaged vehicle.

10. The computer system of claim 9, wherein the description of the damaged vehicle includes an auditory and/or a visual description.

11. The computer system of claim 7, further comprising an analyzer operatively coupled to the one or more processors, the analyzer for evaluating the received crash information of the damaged vehicle with a compilation of collision data of the vehicle type that includes the damaged vehicle.

12. The computer system of claim 11, wherein the compilation of collision data includes a particular treatment complexity level equated to a particular collision data.

13. The computer system of claim 11, wherein the compilation of collision data is stored on the one or more memory devices.

14. The computer system of claim 7, further comprising one or more sensors coupled to the one or more processors to monitor operating information of the damaged vehicle and facilitate providing crash information of the damaged vehicle to the computing device.

15. The computer system of claim 7, further comprising a communication module coupled to the computing device and transmitting information associated with treating the damaged vehicle to the selected treatment facility.

16. A non-transitory computer-readable storage medium storing instructions that when executed by one or more processors of a computer system cause the computer system to:

assign a treatment complexity level to each of a plurality of indications of treatment facilities, treatment complexity level representing a degree of difficulty associated with treating damaged vehicles, including repairing, salvaging, or scrapping;

store each of the plurality of indications of treatment facilities and the assigned treatment complexity level;

receive crash information near or at the time of the crash and including vehicle operating data of a damaged vehicle from one or more sensors coupled to the damaged vehicle;

evaluate the received crash information with collision data of a vehicle type that includes the damaged vehicle;

determine the treatment complexity level associated with treating the damaged vehicle based on the evaluation of the received crash information;

select the treatment facility for treating the damaged vehicle based on the stored indications of treatment facilities and assigned treatment complexity levels corresponding to the determined treatment complexity level of the damaged vehicle; and transmit information associated with treating the damaged vehicle.

17. The non-transitory computer-readable storage medium of claim 16, wherein information associated with treating the damaged vehicle includes information associated with transporting the damaged vehicle to the selected treatment facility.

18. The non-transitory computer-readable storage medium of claim 16, wherein the crash information about the damaged vehicle includes a description of the damaged vehicle.

19. The non-transitory computer-readable storage medium of claim 18, wherein the description of the damaged vehicle includes an auditory and/or a visual description.

* * * * *